United States Patent [19]

Gould

[11] 4,036,929

[45] July 19, 1977

[54] METHOD OF FORMING DECORATIVE INSERTS IN GRANITE AND THE LIKE

[76] Inventor: Eugene L. Gould, 309 Market St., Kittanning, Pa. 16201

[21] Appl. No.: 657,958

[22] Filed: Feb. 13, 1976

[51] Int. Cl.[2] .................. B29D 3/00

[52] U.S. Cl. .................. 264/132; 264/129; 264/138; 264/162; 264/245; 264/247

[58] Field of Search .................. 264/129, 131, 132, 138, 264/162, 245, 246; 427/272, 275, 355

[56] References Cited

U.S. PATENT DOCUMENTS

| | | | |
|---|---|---|---|
| 1,622,969 | 3/1927 | Page | 264/162 X |
| 3,097,080 | 7/1963 | Weir | 264/162 X |
| 3,324,213 | 6/1967 | Anfinset | 264/162 X |
| 3,463,653 | 8/1969 | Letter | 264/162 X |
| 3,917,786 | 11/1975 | Weigert | 264/138 X |

*Primary Examiner*—Richard R. Kucia
*Attorney, Agent, or Firm*—Buell, Blenko & Ziesenheim

[57] ABSTRACT

A method of embellishing memorial stones and the like wherein a cavity is cut or sandblasted in the stone to produce a decorative design. An epoxy resin base is inserted into the cavity and permitted to set. Decorative glass chips are arranged in a mosaic-like pattern in a resin of similar properties to the base, the mortar, and a bond is formed between the base resin, the mortar resin, and the decorative chips to provide a pattern on the memorial stone.

2 Claims, 3 Drawing Figures

METHOD OF FORMING DECORATIVE INSERTS IN GRANITE AND THE LIKE

This invention relates to a method of forming embellishments on memorial stones and particularly to forming embellishments capable of withstanding moisture and temperature on granite memorial stones. The uses of stones as memorial markers dates back to the dawn of civilization. Over these many years the deceased have been memorialized by carvings or etchings in granite or by pictures of the deceased inserted on the marker by various kinds of anchors. These carvings, etchings and pictures have been in the main, the only methods of individualizing memorial markers. Because of these few forms of embellishments, monuments in a cemetery tend to have a look-alike appearance, indicating a lack of artistic and technological advancement.

The present invention provides a novel and significant improvement over present methods of embellishing memorial markers. The present invention provides a method which economically permits the embellishment of any marker or monument to secure an individualized and permanent remembrance for the deceased. The invention provides a method which will secure the embellishment regardless of the elements.

In a preferred embodiment of my invention, a cavity is cut or sandblasted in the memorial granite or marble stone in the shape of the embellishment. An epoxy resin is inserted into the cavity to a level below the surface of the granite. This base is permitted to set to form a level surface. The epoxy resin used to form the base must be capable of adhering to the granite substance and is characterized by its resistance to changes in moisture and temperature. Once the base material has set, an epoxy resin, the mortar, is placed in the cavity. This mortar resin is capable of being bonded to the base material and is characterized by its ability to remain elastic even under extreme changes of temperature. Into the mortar is inserted decorative material such as glass chips to form the embellishment. The mortar material is permitted to set, impregnated with the decorative chips. A mosaic embellishment is inexpensively formed which is resistant to the elements and becomes an integral part of the design carving which identifies the memorial stone. In the foregoing general description, I have set out certain purposes, objects and advantages of my invention.

It will be described hereafter and will become apparent for those skilled in the art of stone embellishment when considering the following description and drawings in which.

Figure 1:
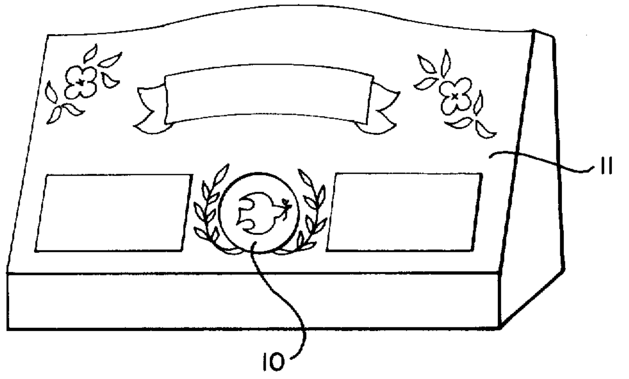
FIG. 1 is a perspective view of a memorial stone embellished by the method of the present invention.
Figure 3:
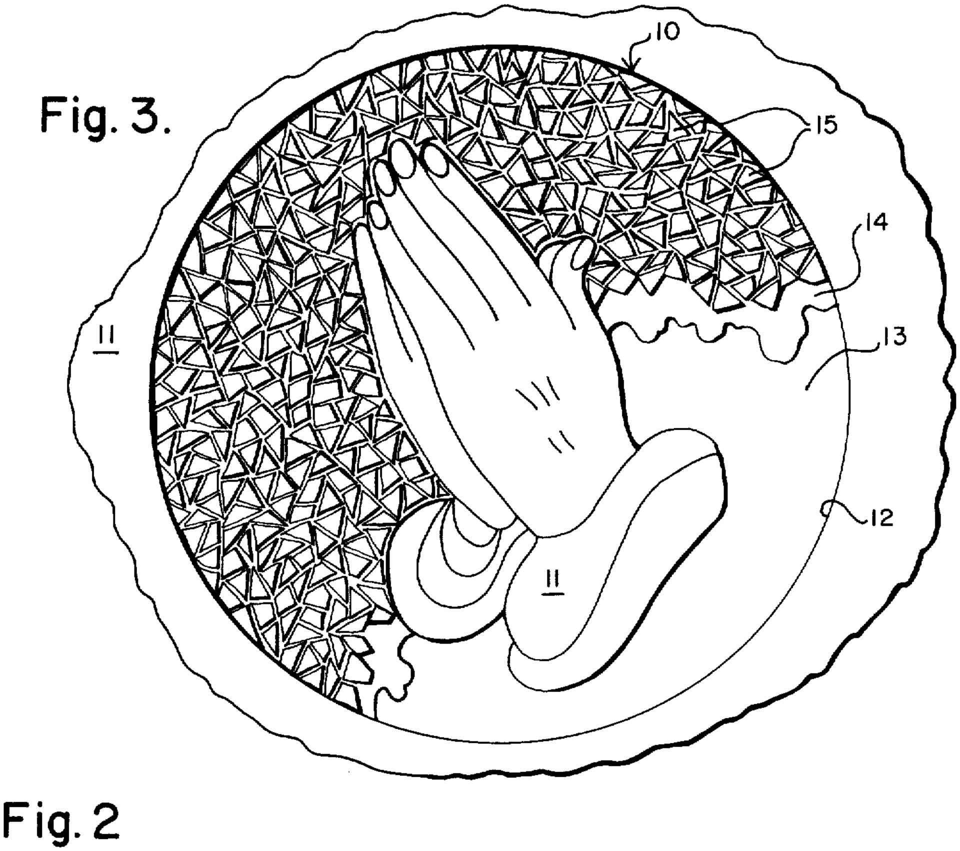
FIG. 3 is a plan view of another embellishment made by the method of the present invention.
Figure 2:
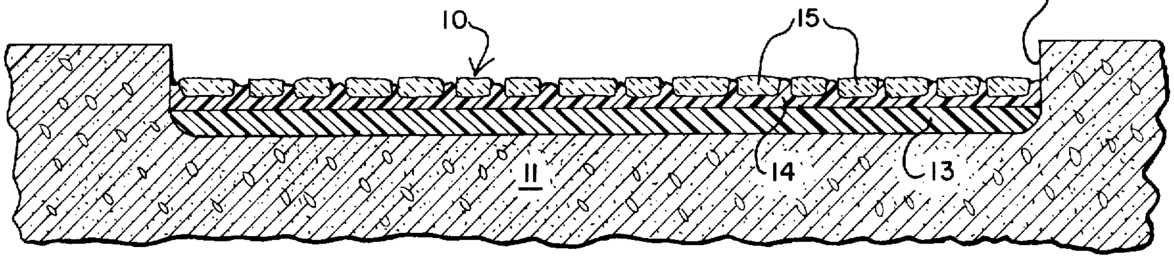
FIG. 2 is a sectional view taken along line II—II of FIG. 1.

Referring to FIG. 1, an embellishment 10 made of glass decorative chips in the form of a dove of peace has been mounted on granite stone 11 by the method of the present invention. The glass decorative chips can be used either to form a particular figure or as a background to accentuate the embellishment. Recess 12 is cut into the stone by sandblasting in the approximate form of embellishment 10. Once recess 12 had been sandblasted away, base resin 13 is placed in the cavity below the surface of the stone, and permitted to set. Base resin 13 is a two-part epoxy system having blended fillers such as Epichlorohydrin Bisphenol-A coupled with a modified aliphatic amine as a catalytic agent. The resultant physical properties of such a system in the fully cured state allow it to adhere to the stone and resist both moisture and temperature. The base resin when set has a paralleling coefficient of thermal expansion and contraction to that of the granite allowing it to adhere to the granite substrate without violating the adhesive bond. When resin 13 has set, a secod resin, mortar 14, is inserted into the cavity. The mortar resin is an unpigmented one-part epoxy filled system having modified aliphatic amines as a catalyst which permit it to remain elastic even under extreme changes of temperature. The mortar resin is also capable of adhering to the base resin and to the decorative chips.

Decorative chips 15 are inserted into the mortar resin 14 in the pattern of the embellishment 10. As referred to above, the chips can form the figure itself or be used as background to accent a cut or sandblasted figure. Decorative chips of various colors can be used to make the embellishment multi-colored and of greater aesthetic appeal. Once the chips have been inserted, they are permitted to set in the mortar resin 14. In this embodiment, the decorative chips are set individually into the mortar resin. The method of the present application is not limited to the individual setting of the decorative chips. The embellishment can be pre-made by placing a photograph or drawing of the embellishment on a table under a piece of clear glass. A clear nonadhesive material is placed over the glass and a nylon netting placed over this surface. The decorative chips would then be arranged over the netting and adhered to the nylon netting material by means of suitable commercially available adhesive. Once the decorative chips had adhered to the nylon netting, it could be peeled from the non-stick, low-friction surface and the entire design now placed in the mortar resin 14. The apertures in the nylon netting would permit the mortar resin 14 to flow into the spaces between the decorative chips 15.

A permanent temperature and moisture resistive decorative embellishment is formed easily and inexpensively on a granite marker so as to individualize the stone.

In the foregoing specification, I have set out certain preferred embodiments of my invention, however, it will be understood that this invention may be otherwise embodied within the scope of the following claims.

I claim:

1. A method of embellishing memorial stones of granite, marble and the like with decorative inserts comprising the steps of:

a. cutting a recess into the face of a memorial stone in the approximate shape of the desired embellishment;

b. placing a moisture and temperature resistant base resin into said recess below the level of said recess and allowing said resin to set;

c. placing a mortar which is elastic over a wide temperature range into said recess over said base resin; and d. inserting decorative chips into said mortar resin to form a desired embellishment.

2. The method of claim 1 wherein said base resin is a two-part epoxy filled system having amines as a catalyst and said mortar resin is a one-part unpigmented epoxy system having modified aliphatic amines as a catalyst.

* * * * *